United States Patent [19]
Ono et al.

[11] Patent Number: 6,029,924
[45] Date of Patent: Feb. 29, 2000

[54] RETRACTOR FOR A SEAT BELT

[75] Inventors: Katsuyasu Ono; Satoshi Hirase, both of Kanagawa, Japan

[73] Assignee: NSK Ltd., Tokyo, Japan

[21] Appl. No.: 09/165,289

[22] Filed: Oct. 2, 1998

[30] Foreign Application Priority Data

Oct. 3, 1997 [JP] Japan .................................. 9-271422
Oct. 7, 1997 [JP] Japan .................................. 9-274533

[51] Int. Cl.⁷ .................................................. B60R 22/28
[52] U.S. Cl. ........................................................ 242/379.1
[58] Field of Search ........................ 242/379.1; 280/805, 280/806; 297/470, 471, 472

[56] References Cited

U.S. PATENT DOCUMENTS 3,929,300  12/1975  Lindqvist .
4,366,934   1/1983  Seifert et al. .
5,344,095   9/1994  Frei ........................................ 242/374
5,526,996   6/1996  Ebner et al. ............................ 242/374
5,628,469   5/1997  Fohl ...................................... 242/379.1
5,738,293   4/1998  Fohl ...................................... 242/379.1

FOREIGN PATENT DOCUMENTS 2-45088  11/1990  Japan .

*Primary Examiner*—John M. Jillions
*Attorney, Agent, or Firm*—Sughrue, Mion, Zinn, Macpeak & Seas, PLLC

[57] ABSTRACT

A seat belt retractor is provided with a base having a pair of side plates, a bobbin coupled with a webbing, a torsion bar rotatably supported on the side plates of the base, one end of the torsion bar being coupled with the bobbin, and a locking mechanism coupled with another end of the torsion bar, the locking mechanism connecting the another end of the torsion bar with the base in a first state and not connecting in a second state. The torsion bar includes a torsionally deformable portion between two coupling portions thereof, and at least a part of the torsionally deformable portion is located outside beyond the side wall of the base.

6 Claims, 9 Drawing Sheets

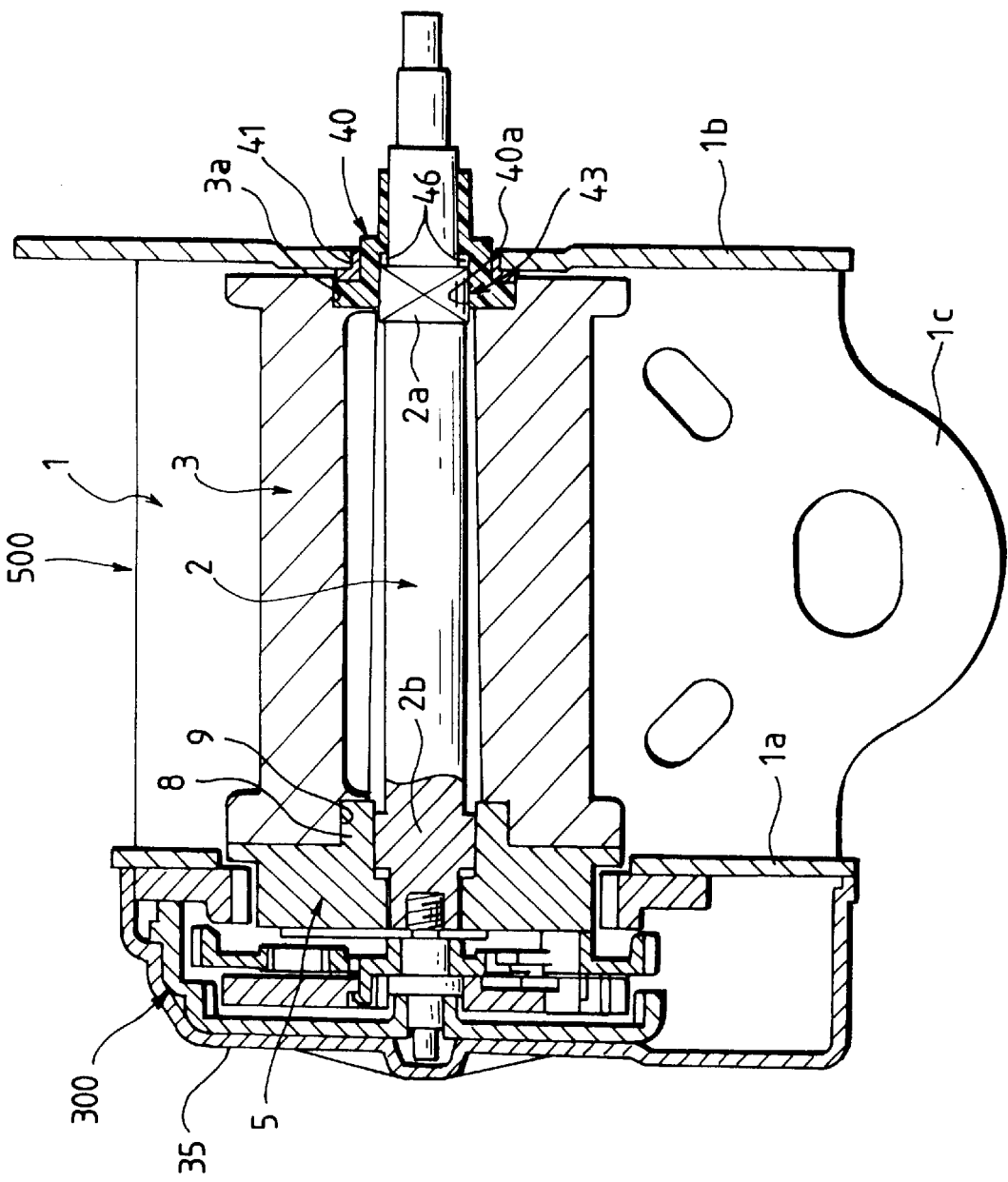

RETRACTOR FOR A SEAT BELT

BACKGROUND OF THE INVENTION

1. Field of the Invention

The present invention relates to a retractor for a seat belt device, and more particularly to a seat belt retractor having an energy absorbing mechanism including a torsion bar.

2. Description of the Related Art

A retractor for seat belt of a motor vehicle is used for restraining a passenger on a seat of the vehicle to secure a safety of the passenger. In this field of the seat belt retractor, an emergency-locking type belt retractor is used which includes an emergency locking mechanism for physically locking a retractor by means of an inertia sensing means responding to abrupt acceleration, impact, or abrupt deceleration, whereby it effectively and safely restrains the passenger.

U.S. Pat. Nos. 3,929,300 and 4,366,934, and Japanese Utility Model Publication No. Hei. 2-45088 may be enumerated for the conventional techniques for the emergency-locking type belt retractor. In the locking mechanism disclosed in the above publications, an engaging member which is provided at one end of a take-up shaft having a webbing wound thereon, in case of emergency, comes in engagement with an engaging-member receiving part of a retractor base, to thereby lock the rotation of the take-up shaft in the web unwinding direction.

In a situation where a collision occurs, and the emergency locking mechanism of the emergency-locking type belt retractor operates in response to the collision to lock the webbing in its pulling-out motion, if an impact force by the collision is extremely large, a webbing tension increases with the elapsing of time after the collision. As a result, an abrupt deceleration is generated in the passenger body, and a load acting on the passenger from the webbing is extremely large. Various proposals to cope with this problem have been made. One of those proposals uses an energy absorbing mechanism which absorbs an impact force acting on the passenger body in such a manner that when a load acting on the webbing exceeds a predetermined value of load, it unwinds the webbing with a predetermined length.

Many seat belt retractors with the energy absorbing mechanisms have been proposed (e.g., U.S. Pat. Nos. 5,344,095 and 5,526,996).

This type of the seat belt retractor comprises:
a take-up shaft, substantially cylindrical, on which a webbing is wound;
a torsion bar passing through a center hole of the take-up shaft, one end of the torsion bar being coupled with the take-up shaft in an unrotative fashion while the other end thereof being coupled with a locking base also in an unrotative fashion; and
emergency locking means causing, in case of emergency, the locking base to engage with a retractor base to lock the torsion bar in its rotation and hence to lock the rotation of the take-up shaft in the direction in which the webbing is pulled out;
wherein when a tension, which acts on the webbing during the operation of the emergency locking means, exceeds a predetermined value of tension, an impact energy is absorbed through a torsional deformation of the torsion bar while at the same time a tension acting on the webbing is controlled.

Thus, the above impact energy absorbing technique absorbs the impact energy through a deformation of the torsion bar passing through the center hole of the take-up shaft. Another impact energy absorbing technique is known which absorbs the impact energy through a plastic deformation of the take-up shaft per se, the retractor base or the like. When comparing with the latter technique, the former technique has the following advantages: 1) A design freedom is high in the design on an energy absorbing amount and the unwinding amount of the webbing, and 2) the structure is simple and hence advantageous in size reduction of the belt retractor.

The number of twists of the torsion bar in the conventional seat belt retractor is inversely proportional to the diameter of the torsion bar; viz., it increases with decrease of the bar diameter or decreases with increase of the bar diameter. On the other hand, the number of twists of the torsion bar in the conventional seat belt retractor is proportional to the length of the torsion bar.

Therefore, attempt to obtain a high torsion torque by increasing the bar diameter entails an insufficient number of twists of the torsion bar. Where a long energy absorption length is required, the torsion bar needs to be elongated. However, attempt to simply elongate the torsion bar is rejected since there is a limit in increasing the size of the seat belt retractor when it is mounted on the vehicle body, and the retractor base has a predetermined width.

Further, as described above, the torsion bar is known of which one end or first end is coupled with the take-up shaft in an unrotative fashion and the other end or second end is coupled with a locking base also in an unrotative fashion. This torsion bar sometimes changes its axial length through a twist deformation of the torsion bar when the energy absorbing progresses.

When the axial length of the torsion bar increases with progress of the torsion deformation, the locking base that is coupled with the second end of the torsion bar moves outside beyond the retractor base. As a result, the axial alignment in the emergency locking means, which engages the locking base with the retractor base in case of emergency, is lost, and its locking strength is possibly reduced.

In a case where the stopper means, which stops the rotation of the take-up shaft in the unwinding direction of the webbing when a torsion quantity of the torsion bar exceeds a predetermined quantity of torsion, includes 1) a pair of guide grooves, shaped like C, which are formed in the end face of the locking base closer to the take-up shaft and the end of the take-up shaft closer to the locking base, and 2) a lock piece slidable along the inner walls of those grooves, if the axial length of the torsion bar increases with process of the torsion deformation, an interstice between the end face of the locking base closer to the take-up shaft and the end face of the take-up shaft closer to the locking base is widened. The axial coupling portion of the lock piece with the grooves is reduced. The necessity to cope with this is to deepen the grooves and to increase the size of the lock piece.

SUMMARY OF THE INVENTION

Accordingly, an object of the present invention is to provide a seat belt retractor which can increase the number of twists of the torsion bar where the retractor base of the limited size is used.

Another object of the present invention is to provide a seat belt retractor which can eliminate the disadvantages created by a change of the axial-direction length of the torsion bar, which results from a torsional deformation of the torsion bar.

To achieve the above object, there is provided a seat belt retractor comprises: a take-up shaft, substantially cylindrical, on which a webbing is wound; a torsion bar passing through a center hole of the take-up shaft, one end of the torsion bar being coupled with the take-up shaft in an unrotative fashion while the other end thereof being coupled with a locking base also in an unrotative fashion; and emergency locking means causing, in case of emergency, the locking base to engage with a retractor base to lock the torsion bar in its rotation and hence to lock the rotation of the take-up shaft in the direction in which the webbing is pulled out; wherein when a tension, which acts on the webbing during the operation of the emergency locking means, exceeds a predetermined value of tension, an impact imparted on the passenger is absorbed through a torsional deformation of the torsion bar, wherein one of the coupling portions of the torsion bar with the take-up shaft and the locking base is extended outside beyond the side wall of the retractor base.

Therefore, a distance between the coupling portions located at both ends of the torsion bar is increased. A length of a deformable portion of the torsion bar, which is located between the coupling portions, is substantially increased without increasing an overall length of the torsion bar.

The coupling portion of the torsion bar where it is coupled with the take-up shaft is preferably inserted into an insertion hole of a retainer fit in a recess formed at one end of the take-up shaft. The result is: 1) the torsion bar is rotatable together with the take-up shaft; 2) the insertion hole of the retainer serves as a deep hole extending in the axial direction; and 3) the coupling portion of the torsion bar that is inserted into the insertion hole is located outside the side plate of the retractor base.

Further, there is provided a seat belt retractor comprising: a base having a pair of side plates; a bobbin coupled with a webbing; a torsion bar rotatably supported on the side plates of the base, one end of the torsion bar being coupled with the bobbin; and a locking mechanism coupled with another end of the torsion bar, the locking mechanism connecting the another end of the torsion bar with the base in a first state and not connecting in a second state, wherein at least one of two coupling portions of the torsion bar at which the torsion bar is coupled with the bobbin and the locking mechanism is axially displaceable.

Even if the axial length of the torsion bar changes through a torsional deformation of the torsion bar during its energy absorbing operation, one of the coupling portions of the torsion bar moves in the axial direction of the torsion bar, whereby a change of the axial length of the torsion bar is absorbed.

The result is to prevent the end face of the locking member closer to the take-up shaft from forcibly and slidably contacting with the end face of the take-up shaft closer to the locking member, and the locking member from moving to outside the base.

Preferably, the coupling portions are based on the light press fitting that provides no play of them in the radial directions. More preferably, the light press fitting of the coupling portions is carried out in the thrust directions (axial direction of the torsion bar).

BRIEF DESCRIPTION OF THE DRAWINGS

In the accompanying drawings:

FIG. 5 is a front, longitudinal sectional view showing a state of the FIG. 4 seat belt retractor in which a torsion bar is torsionally deformed;

DETAILED DESCRIPTION OF THE PREFERRED EMBODIMENTS

The preferred embodiments of the present invention will be described with reference to the accompanying drawings.

Figure 1:
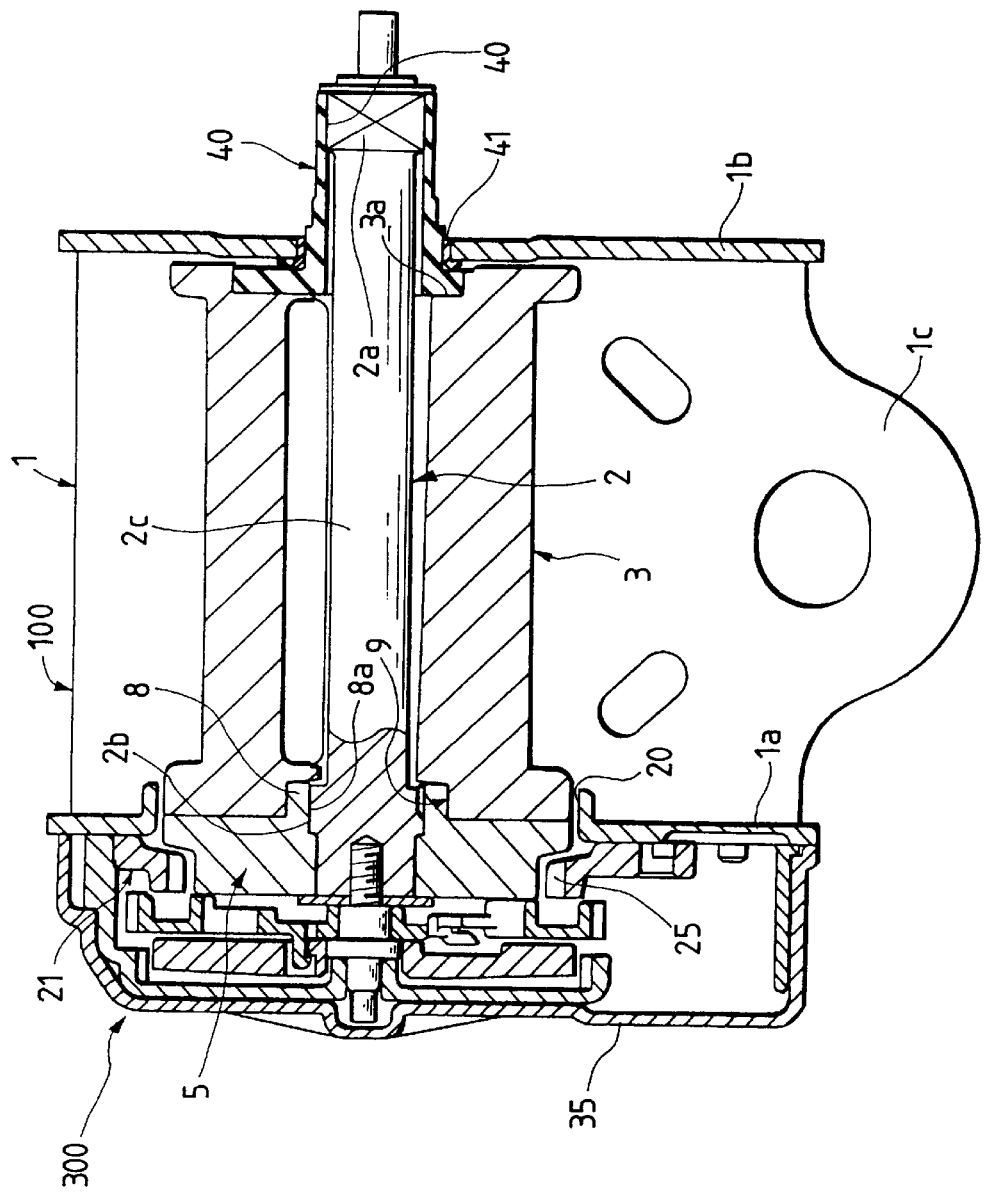
FIG. 1 is a front, longitudinal sectional view showing a seat belt retractor which is a first embodiment of the present invention.
Figure 2:
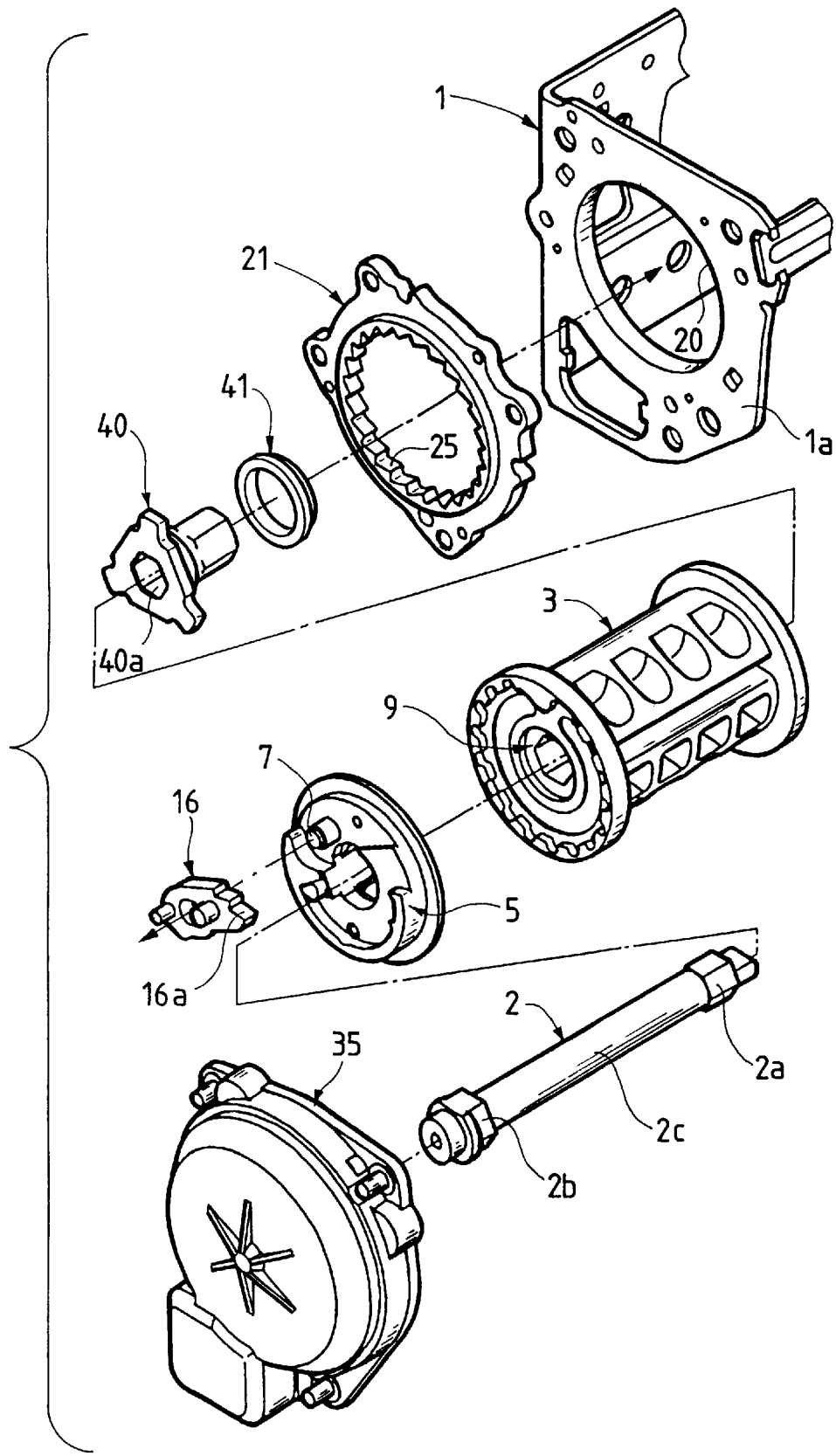
FIG. 2 is an exploded view showing a key portion of the seat belt retractor shown in FIG. 1.

FIG. 1 is a front, longitudinal sectional view showing a seat belt retractor 100 which is a first embodiment of the present invention. FIG. 2 is an exploded view showing a key portion of the seat belt retractor 100 shown in FIG. 1.

The seat belt retractor 100 generally includes a bobbin 3, substantially cylindrical, on which a webbing is wound, a torsion bar 2, and an emergency locking mechanism 300. The torsion bar 2 is inserted into the bobbin 3 and is rotatably supported on a retractor base 1. One end (the right end in FIG. 1) of the torsion bar 2 is firmly coupled with the bobbin 3, while the other end (the left end in FIG. 1) is coupled with a locking base 5 shaped like a disc. The emergency locking mechanism 300, in case of emergency, locks the rotation of the locking base 5 in the webbing unwinding direction.

The retractor base 1 has a back plate 1c to be fastened on the vehicle body, and right and left side plates 1a and 1b standing upright on the right and left sides of the back plate 1c. The retractor base 1 is formed by shaping, by press, a metal plate to be like U in cross section. The torsion bar 2 combined with the bobbin 3 is rotatably stretched between the right and left side plates 1a and 1b. A known take-up spring (not shown), which constantly urges the bobbin 3 in the webbing taking-up direction with the torsion bar 2 interposing therebetween, is provided at one end of the torsion bar 2, which is placed in the side plate 1b of the retractor base 1.

A bobbin coupling portion 2a is provided at one end of the torsion bar 2. With provision of the bobbin coupling portion 2a, the torsion bar 2 is rotatable together with the bobbin 3. A locking-base coupling portion 2b is provided at the other end of the energy absorbing member 2. With provision of the locking-base coupling portion 2b, the torsion bar 2 is rotatable together with the locking base 5. Those coupling portions 2a and 2b are hexagonal in cross section.

A retainer 40 having an insertion hole 40a, hexagonal in cross section, is fit to a recess 3a (hexagonal in cross section) of one side of the bobbin 3. The bobbin coupling portion 2a is inserted into the insertion hole 40a, whereby the bobbin coupling portion 2a is coupled with one end of the bobbin 3, and is rotatable together with the bobbin 3. The retainer 40 is disposed passing through the side plate 1b of the retractor base 1.

The retainer 40, which is rotatably supported on the side plate 1b of the retractor base 1 in a state that a bush 41 is interposed therebetween, is a deep hole extending in the axial direction. The bobbin coupling portion 2a of the torsion bar 2, while being inserted into the insertion hole 40a, is located outside the side plate 1b of the retractor base 1. The bobbin coupling portion 2a of the torsion bar 2 is coupled with the bobbin 3 with the aid of the retainer 40 having a sufficient strength, and rotatable together with the bobbin 3. With this coupling structure, the bobbin coupling portion 2a of the torsion bar 2 is firmly coupled with one end of the bobbin 3 and rotatable together with the latter, without making the structure of the bobbin 3 complicated, although the bobbin coupling portion 2a is located outside the side plate 1b, which is located outside one end (right side in FIG. 1) of the bobbin 3 when viewed in the axial direction.

The locking-base coupling portion 2b, hexagonal in cross section, is inserted into an insertion hole 8a, also hexagonal in cross section, of a cylindrical boss portion 8 protruded from the end surface of the locking base 5 that is closer to the bobbin. With this, the locking-base coupling portion 2b is rotatable together with the locking base 5.

A recess 9 (circular in cross section) for receiving the boss portion 8 (circular in cross section) of the locking base 5 is formed in the end face of the bobbin 3 that is closer to the locking base 5. The bobbin 3 is axially supported, with the aid of the recess 9, while being rotatable with respect to the locking base 5 and the torsion bar 2.

The torsion bar 2 is an energy absorbing mechanism constructed such that when a torque in excess of a predetermined value of torque acts on a deformable portion 2c formed between the locking-base coupling portions 2a and 2b, this deformable portion 2c is torsionally deformed to absorb the energy of the impact force acting on the body of the passenger.

In the present embodiment, the torsion bar 2 is arranged such that the end portion of its deformable portion 2c closer to the bobbin coupling portion 2a is extended outside beyond the side plate 1b, and the bobbin coupling portion 2a is also located outside the side plate 1b. Therefore, a distance between the coupling portions 2a and 2b of both ends of the torsion bar 2 is increased. The deformable portion 2c of the torsion bar 2, which is located between the coupling portions, is substantially elongated without increasing the overall length of the torsion bar 2.

The emergency locking mechanism 300 for locking, in case of danger, the rotation of the locking base 5 in the webbing unwinding direction may be constructed by known technique. A specific example of the emergency locking mechanism 300 is illustrated in FIG. 2. A pawl 16 having a claw 16a at its tip is rotatably supported on a support shaft 7 of the locking base 5. A ratchet 21 having a circular hole defined by the toothed wall or inner teeth 25 is disposed outside an opening 20 of the side plate 1a of the retractor base 1. The claw 16a of the pawl 16 comes in engagement with the inner teeth 25 of the ratchet 21.

In the emergency locking mechanism 300 that is disposed on the inside of a sensor cover 35, the claw 16a of the pawl 16 is brought into engagement with one of the inner teeth 25 of the ratchet 21, to thereby lock the rotation of the locking base 5 in the webbing unwinding direction.

An operation of the seat belt retractor 100 thus constructed will be described.

In case of emergency, e.g., when a vehicle collision occurs, the emergency locking mechanism 300 operates to lock the rotation of the locking base 5, which is coupled with the other end of the torsion bar 2, in the webbing unwinding direction. With a load acting on the webbing, a rotating torque in excess of a preset value of torque acts on one end of the torsion bar 2 through the bobbin 3, and the torsional deformation of the torsion bar 2 starts to absorb the impact energy.

During the energy absorbing operation, the bobbin 3, of which the recess 9 (circular in cross section) is rotatably supported on the boss portion 8 (circular in cross section) of the locking base 5, is smoothly slidable, while the end of the bobbin 3 closer to the locking base 5 is rotated relative to the torsion bar 2. Therefore, an energy absorbing load, which absorbs an impact energy through a torsional deformation of the torsion bar 2, stably varies with a twist angle variation.

As referred to above, the torsion bar 2 is arranged such that the end portion of its deformable portion 2c closer to the bobbin coupling portion 2a is extended outside beyond the side plate 1b. Therefore, a distance between the coupling portions 2a and 2b of both ends of the torsion bar 2 is increased. The deformable portion 2c of the torsion bar 2, which is located between the coupling portions, is substantially elongated without increasing the overall length of the torsion bar 2.

For this reason, the seat belt retractor 100 under discussion is capable of increasing the number of twists of the torsion bar 2 without increasing the length (when longitudinally viewed) of the retractor base 1, and hence stably secures a satisfactory number of twists of the torsion bar.

Further, the seat belt retractor 100 can provide a satisfactory number of twists of the torsion bar 2 even if the torsion bar 2 is increased in its diameter to obtain a high torsional torque, and a long energy absorbing length is required.

Figure 3:
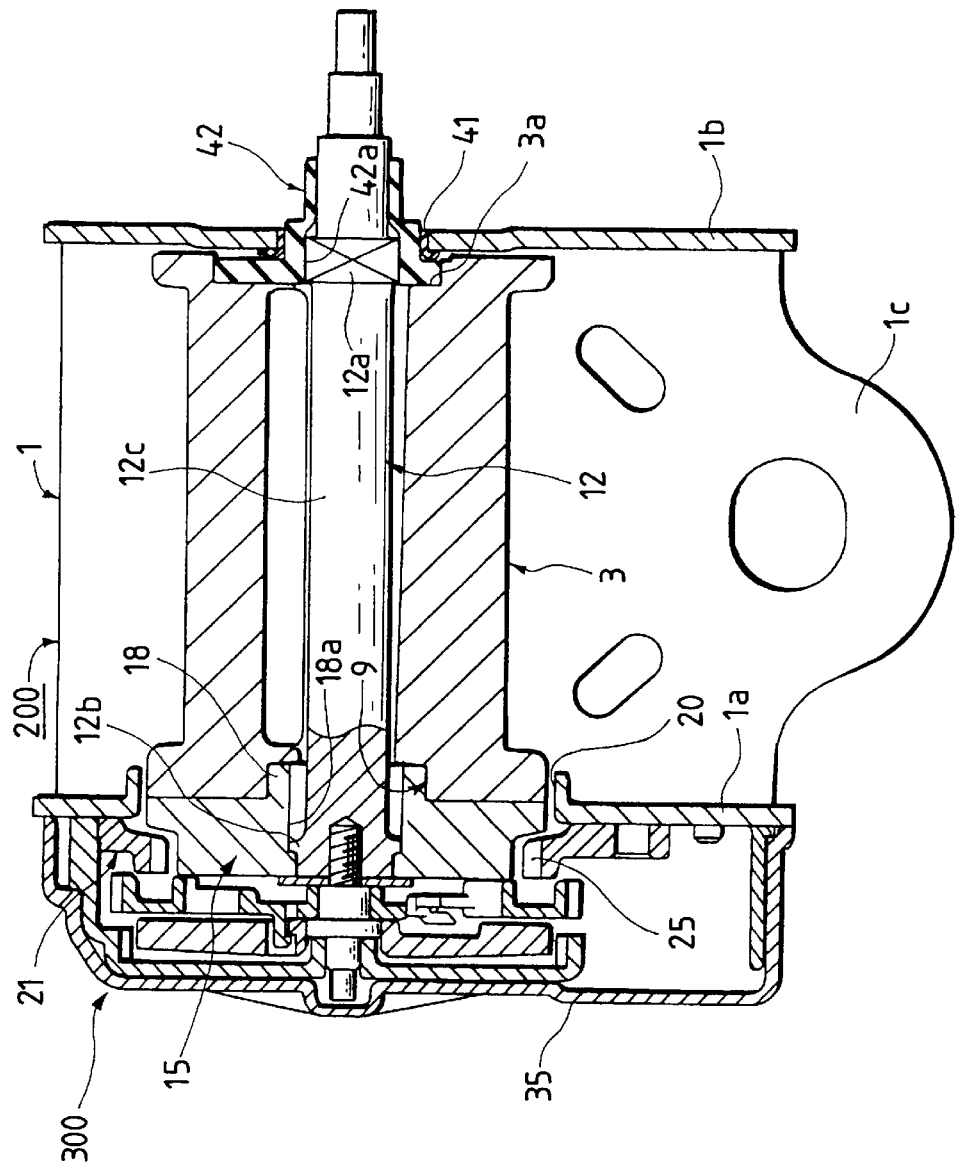
FIG. 3 is a front, longitudinal sectional view showing a seat belt retractor which is a second embodiment of the present invention.

FIG. 3 is a front, longitudinal sectional view showing a seat belt retractor 200 which is a second embodiment of the present invention. For ease of explanation, like reference numerals are used to designate like or equivalent portions of the seat belt retractor 100 of the first embodiment of the invention.

In the seat belt retractor 200, a torsion bar 12 is inserted into the bobbin 3 and is rotatably supported on a retractor base 1. One end (the right end in FIG. 3) of the torsion bar 12 is firmly coupled with the bobbin 3, while the other end (the left end in FIG. 3) is coupled with a locking base 5 shaped like a disc. An emergency locking mechanism 300, in case of emergency, locks the rotation of the locking base 5 in the webbing unwinding direction.

A bobbin coupling portion 12a is provided at one end of the torsion bar 12. With provision of the bobbin coupling portion 12a, the torsion bar 12 is rotatable together with the bobbin 3. A locking-base coupling portion 12b is provided at the other end of the energy absorbing member 12. With provision of the locking-base coupling portion 12b, the torsion bar 12 is rotatable together with the locking base 15. Those coupling portions 12a and 12b are hexagonal in cross section.

A retainer 42 having an insertion hole 42a, hexagonal in cross section, is fit to a recess 3a (hexagonal in cross section) of one side of the bobbin 3. The bobbin coupling portion 12a is inserted into the insertion hole 42a, whereby the bobbin coupling portion 12a is coupled with one end of the bobbin 3, and is rotatable together with the bobbin 3.

The locking-base coupling portion 12b, hexagonal in cross section, is inserted into an insertion hole 18a, also hexagonal in cross section, of a cylindrical boss portion 18 protruded from the end surface of the locking base 15 that is closer to the bobbin. With this, the locking-base coupling portion 12b is rotatable together with the locking base 15. The locking base 15 passes through the side plate 1a of the retractor base 1. The insertion hole 18a is a deep hole extending in the axial direction, and the deformable portion 12c of the torsion bar 12 is extended outside beyond the side plate 1a of the retractor base 1.

A recess 9 (circular in cross section) for receiving the boss portion 18 (circular in cross section) of the locking base 15 is formed in the end face of the bobbin 3 that is closer to the locking base 15. The bobbin 3 is axially supported, with the aid of the recess 9, while being rotatable with respect to the locking base 15 and the torsion bar 12.

The torsion bar 12 is an energy absorbing mechanism constructed such that when a torque in excess of a predetermined value of torque acts on a deformable portion 12c between the locking-base coupling portions 12a and 12b, this deformable portion 12c is torsionally deformed to absorb the energy of the impact force acting on the body of the passenger.

In the present embodiment, the torsion bar 12 is arranged such that the end portion of its deformable portion 12c closer to the bobbin coupling portion 12a is extended outside beyond the side plate 1a. Therefore, a distance between the coupling portions 12a and 12b of both ends of the torsion bar 12 is increased. The deformable portion 12c of the torsion bar 12, which is located between the coupling portions, is substantially elongated without increasing the overall length of the torsion bar 12.

The thus constructed seat belt retractor 200 of the second embodiment produces the useful effects comparable with those of the seat belt retractor 100 of the first embodiment.

In each of the above-mentioned embodiments, one of the bobbin (take-up shaft) and locking-base coupling portions of the torsion bar is extended outside beyond one of the side plates of the retractor base. In an alternative, the bobbin and locking-base coupling portions of the torsion bar are both extended outside beyond both the side plates of the retractor base.

The emergency locking mechanism 300 may be constructed such that latch teeth are provided on the locking base and a pawl is rotatably supported on the retractor.

In the embodiments mentioned above, the take-up shaft is constructed with the bobbin 3 as one-piece construction of light alloy formed by die casting. Alternatively, the take-up shaft construction may be such that a take-up shaft made of steel is inserted into a bobbin made of light weight material, e.g., resin.

The seat belt retractor of the invention may be provided with a pretensioner mechanism for removing the slack of the webbing by winding up the webbing in case of danger.

Figure 4:
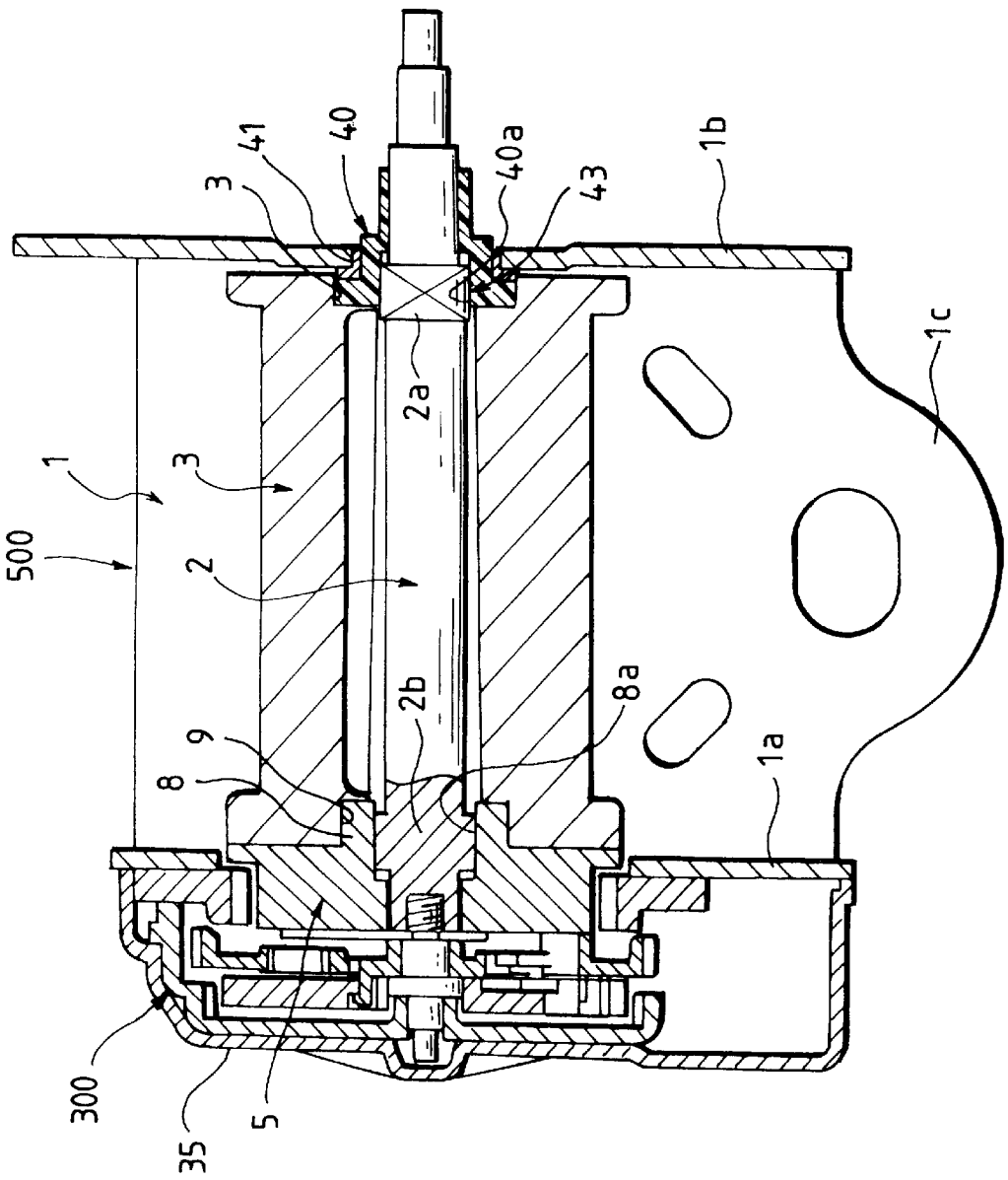
FIG. 4 is a front, longitudinal sectional view showing a seat belt retractor which is a third embodiment of the present invention.

FIG. 4 is a front, longitudinal sectional view showing a seat belt retractor 500 which is a third embodiment of the present invention. FIG. 5 is a front, longitudinal sectional view showing a state of the FIG. 4 seat belt retractor in which a torsion bar is torsionally deformed. For ease of explanation, like reference numerals are used to designate like or equivalent portions of the seat belt retractor 500 of the first embodiment of the invention.

In a coupling portion 43 of the torsion bar 2 with the retainer 40, the bobbin coupling portion 2a of the torsion bar 2 is fit into the insertion hole 40a of the retainer 40 by lightly pressing the bobbin coupling portion 2a in the axial direction (this fitting method will be referred to as a light press fitting). The thus coupled bobbin coupling portion 2a of the torsion bar 2 is axially displaceable but is radially unrotational with respect to the torsion bar 2.

Figure 6A:
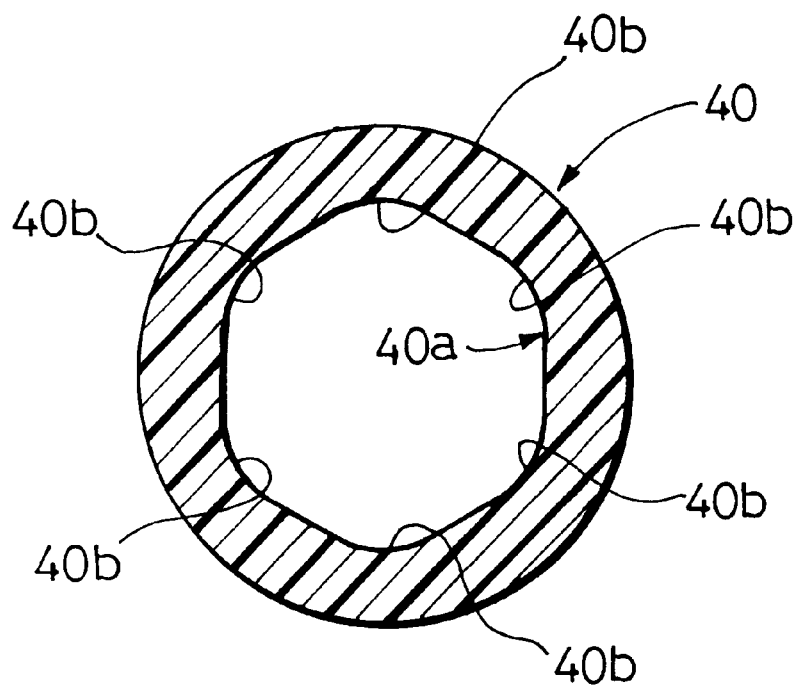
FIGS. 6A and 6B are cross sectional views showing a coupling structure of the torsion bar with the retainer in the FIG. 4 seat belt retractor.

The retainer 40 is rotatably supported on the side plate 1b of the retractor base 1 while the bush 41 is interposed therebetween. The insertion hole 40a of the retainer 40 is configured such that it is hexagonal in cross section and its six corners 40b are curved (FIG. 6A). The bobbin coupling portion 2a of the torsion bar 2 is also hexagonal in cross section.

To couple the torsion bar 2 into the retainer 40, the six vertices of the bobbin coupling portion 2a of the torsion bar 2 are respectively aligned with the corners 40b of the insertion hole 40a of the retainer 40, and in this state, the bobbin coupling portion 2a is fit into the insertion hole 40a of the retainer 40 by light pressure. As a result, the bobbin coupling portion 2a of the torsion bar 2 is put into the insertion hole 40a of the retainer 40 in a light press fitting manner, while having no play in the radial direction.

Figure 6B:
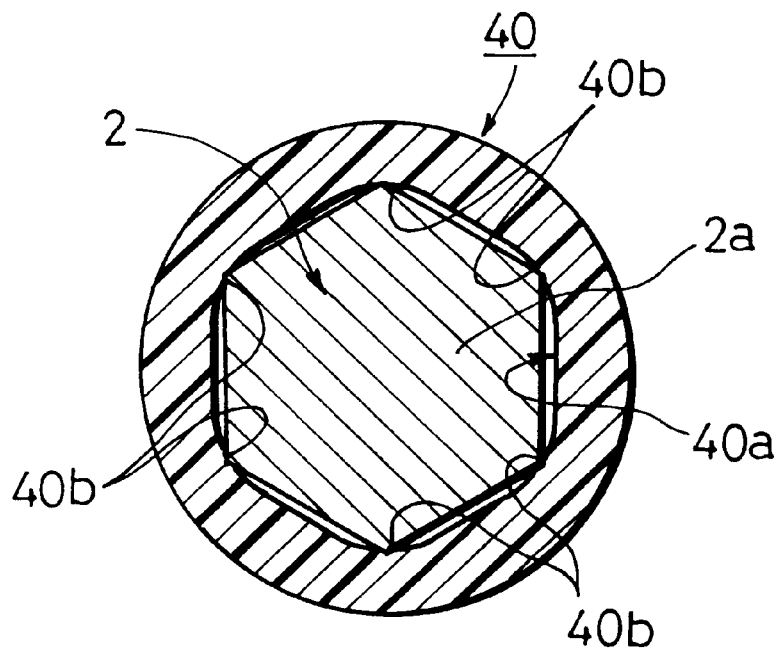

The coupling structure of the bobbin coupling portion with the insertion hole shown in FIG. 6B is effective when it is applied to a case where the twisting direction of the torsion bar 2 is not determined. That is, the coupling is capable of uniformly transmitting a torque in either direction without any phase lag. A fitting strength of the torsion bar 2 to the retainer 40 in the radial direction is secured by setting the fitting length of them in the thrust direction satisfactorily long.

Figure 7A:
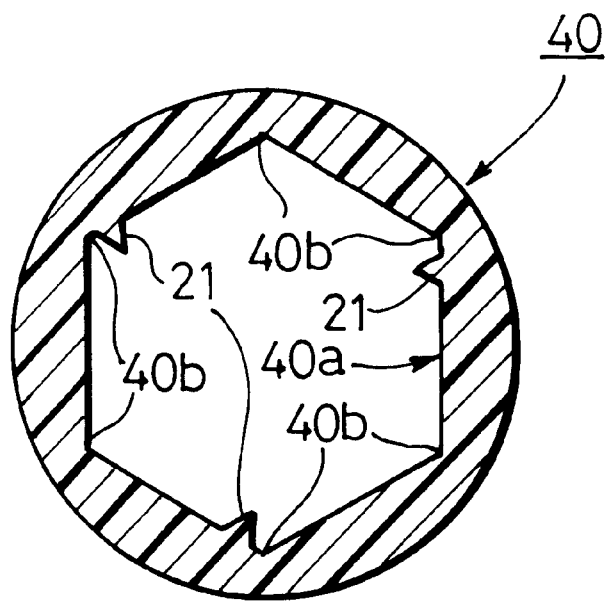
FIGS. 7A and 7B are cross sectional views showing another coupling structure of the torsion bar with the retainer in the FIG. 4 seat belt retractor.

Another coupling structure of the torsion bar 2 with the retainer 40 is illustrated in FIG. 7A. As shown, elongated ridges 21 that extend in the thrust direction and are triangular in cross section are formed on the inner surface of the insertion hole 40a of the retainer 40 at locations slightly off the corners 40b. To couple the torsion bar 2 into the retainer 40, the hexagonal surface of the bobbin coupling portion 2a of the torsion bar 2 is aligned with the elongated ridges 21 of the insertion hole 40a, and in this state, the bobbin coupling portion 2a is press fit into the insertion hole 40a. As a result, the bobbin coupling portion 2a of the torsion bar 2 is put into the insertion hole 40a of the retainer 40 in a light press fitting manner, while having no play in the radial direction.

Figure 7B:
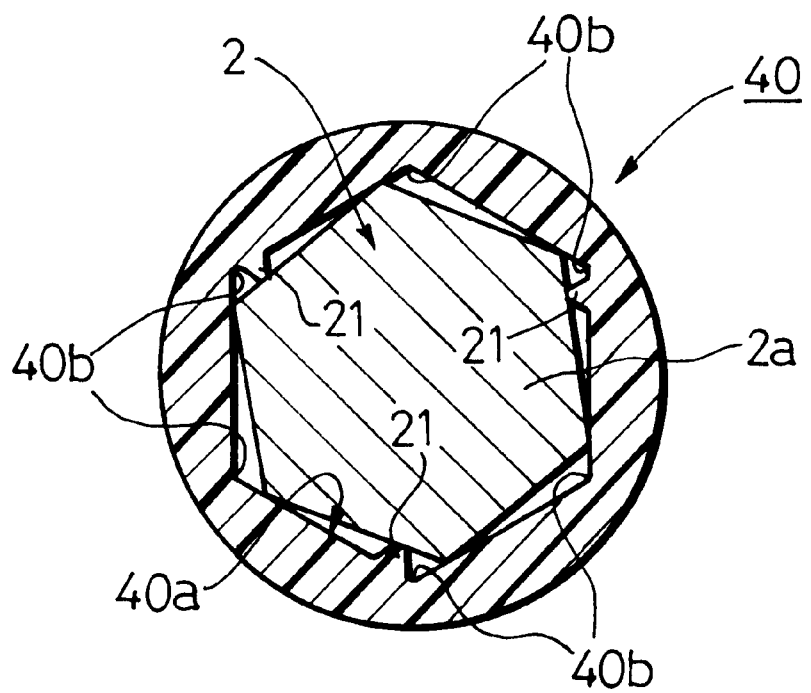

The coupling structure of the bobbin coupling portion with the insertion hole shown in FIG. 7A is effective when it is applied to a case where the twisting direction of the torsion bar 2 is determined. To be more specific, when the torsion bar 2 is twisted clockwise in FIG. 7B, the hexagonal surfaces of the bobbin coupling portion 2a of the torsion bar 2 come in surface contact with the inner surfaces of the insertion hole 40a of the retainer 40 to effect the transmission of a torsion torque, without any breakage of the elongated ridges 21 on the inner surface of the insertion hole 40a. In this case, the bobbin coupling portion 2a is immovable in the radial direction within the insertion hole 40a, and no phase lag occurs in the torque transmission. In an alternative, the elongated ridges 21 may be provided on the outer surface of the bobbin coupling portion 2a of the torsion bar 2.

The locking-base coupling portion 2b (hexagonal in cross section) is fit into the insertion hole 8a (also hexagonal in cross section) of the cylindrical boss portion 8, which is formed in the end surface of the locking base 5 closer to the bobbin 3, whereby the torsion bar 2 and the locking base 5 are coupled together and rotatable in unison. To prevent the locking-base coupling portion 2b from rotating with respect to insertion hole 8a (or the later from rotating with respect to the former), the boss portion 8 may be designed such that the corners of the hexagonal configuration are slightly rounded (FIG. 6A) or the elongated ridges are formed on the facets of the hexagonal configured boss portion (FIG. 7A).

An operation of the seat belt retractor 500 thus constructed will be described.

In case of emergency, e.g., when a vehicle collision occurs, the emergency locking mechanism 500 operates and the torsional deformation of the torsion bar 2 starts to absorb the impact energy as similar to the first embodiment.

During the energy absorbing operation, the bobbin 3, of which the recess 9 is rotatably supported on the boss portion 8 of the locking base 5, is smoothly slidable, while the end of the bobbin 3 closer to the locking base 5 is rotated relative to the torsion bar 2. Therefore, an energy absorbing load, which absorbs an impact energy through a torsional deformation of the torsion bar 2, stably varies with a twist angle variation, and a load acting from the webbing onto the passenger is lessened.

The torsion bar 2 reduces in its length with progress of the torsional deformation, and hence in the coupling portion 43 of the torsion bar 2 with the retainer 40, the torsion bar 2 is displaced to the left in FIG. 5 with respect to the retainer 40 a distance corresponding to a reduced length of the torsion bar; viz., it changes its state from a state of FIG. 4 to a state of FIG. 5. In other words, a change of the length of the torsion bar 2, which is due to its torsional deformation, is absorbed through the displacement of the torsion bar 2. As a result, 1) it never happens that the end face of the locking base 5 closer to the take-up shaft is forcibly brought into slidable contact with the end face of the bobbin 3 closer to the locking base 5, and 2) the energy absorbing load is not instable by any means.

Figure 8:
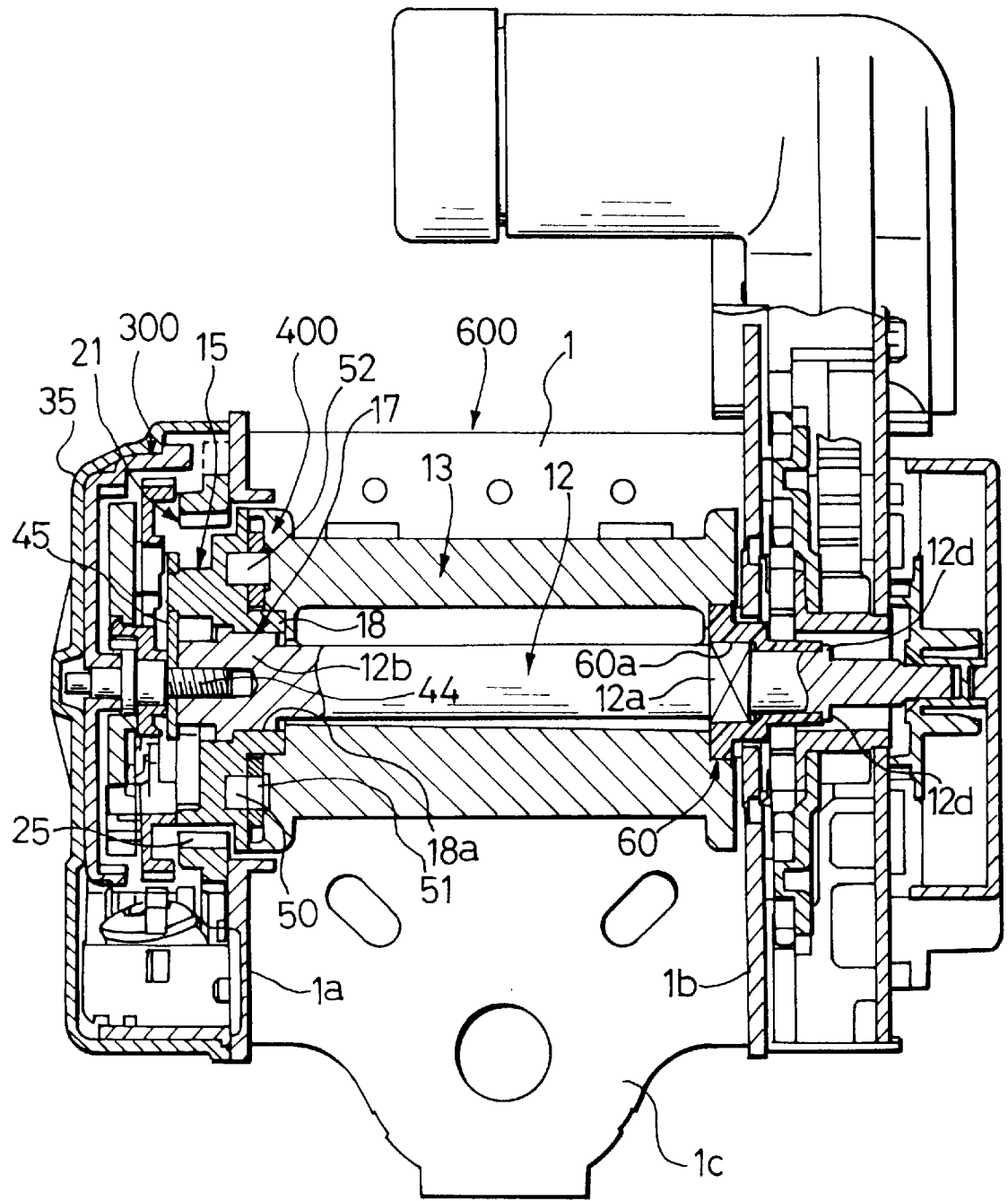
FIG. 8 is a front, longitudinal sectional view showing a seat belt retractor which is a fourth embodiment of the present invention.
Figure 9:
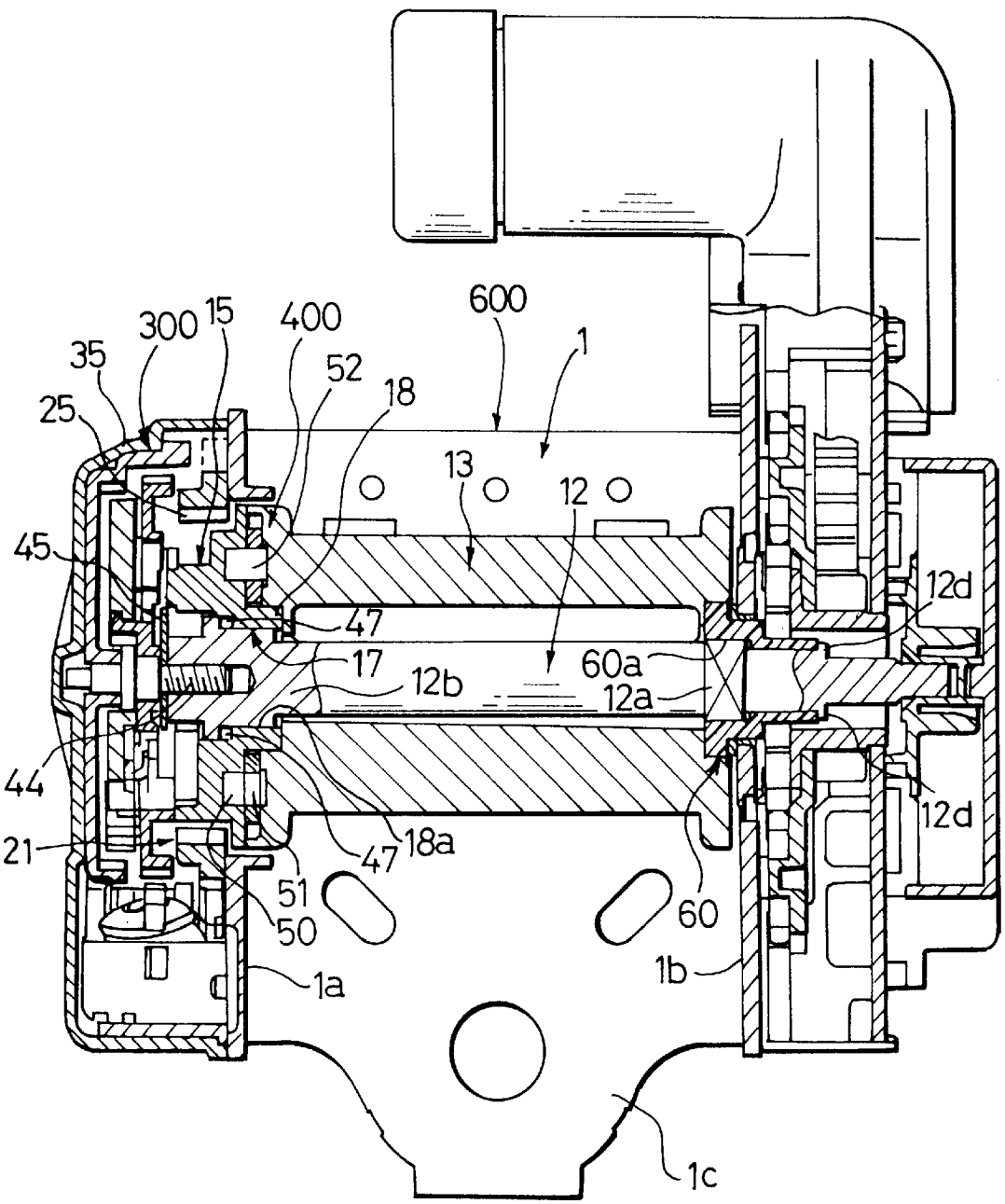
FIG. 9 is a front, longitudinal sectional view showing a state of the FIG. 8 seat belt retractor in which a torsion bar is torsionally deformed to be elongated.

FIG. 8 is a front, longitudinal sectional view showing a seat belt retractor 600 which is a fourth embodiment of the present invention. FIG. 9 is a front, longitudinal sectional view showing a state of the FIG. 8 seat belt retractor in which a torsion bar is torsionally deformed to be elongated.

In the seat belt retractor 600 of the fourth embodiment, the locking-base coupling portion 12b of the torsion bar 12 is coupled into the cylindrical boss portion 18 of the locking base 15 in the coupling portion 17 of the torsion bar 12 with the locking base 15. In this case, the coupling structure of the locking-base coupling portion 12b with the cylindrical boss portion 18 is substantially the same as the coupling structure described referring to FIGS. 6A to 7B.

To be more specific, the locking-base coupling portion 12b of the torsion bar 12 is axially press fit, by a slight pressure, into the insertion hole 18a of the cylindrical boss portion 18. After those are thus coupled together, the torsion bar 12 is displaceable in the thrust directions with respect to the locking base 15 but is radially unrotational.

The bobbin coupling portion 12a of the torsion bar 12 is press fit into an insertion hole 60a of a retainer 60, and an extended part 12d of the bobbin coupling portion 12a, which is extended outward beyond the retainer 60, is caulked around the retainer 60.

A screw member 44 is screwed into the left end of the torsion bar 12 (FIG. 8). The locking base 15 is pushed to the right (FIG. 8) with the screw member 44 in a state that a plate 45 is interposed therebetween, and therefore is pressed against the end face of the bobbin 13 closer to the locking base 15.

The locking base 15, the bobbin 13, the retainer 60 and the torsion bar 12 are coupled together such that only when the torsion bar 12 is elongated owing to its torsional deformation, the screw member 44 and the plate 45 are movable to the left (FIG. 8).

The torsion bar 2 increases in its length with progress of the torsional deformation, and hence in the coupling portion 17 of the torsion bar 12 with the locking base 15, the torsion bar 12 is displaced to the left in FIG. 9 with respect to the locking base 15 a distance corresponding to an increased length (0.7 mm to 1.2 mm) of the torsion bar; viz., it changes its state from a state of FIG. 8 to a state of FIG. 9. In other words, a change of the length of the torsion bar 12, which is due to its torsional deformation, is absorbed through the displacement of the torsion bar 12. As a result, 1) it never happens that the axial alignment of a pawl (not shown) pivotally supported on the locking base 15 with the inner teeth 25 of the ratchet 21 is lost.

A friction force produced in the coupling of the pawl with the inner teeth 25 prevents the locking base 15 from moving with the movement of the screw member 44 and the plate 45 to the left (FIG. 8).

In a case where the stopper means 400, which stops the rotation of the bobbin 13 in the unwinding direction of the webbing when a torsion quantity of the torsion bar 12 exceeds a predetermined quantity of torsion, includes 1) a pair of guide grooves 50 and 51, shaped like C, which are formed in the end face of the locking base 15 closer to the bobbin 13 and the end of the bobbin 13 closer to the locking base 15, and 2) a lock piece 52 slidable along the inner walls of those grooves, the axial coupling portion of the lock piece with the grooves is not reduced, and there is no need of deepening the grooves 50 and 51 and increasing the size of the lock piece 52, with no increase of the gap between the locking base 15 and the bobbin 13.

If the bobbin coupling portion 2a of the torsion bar 2 is press fit into the insertion hole 40a of the retainer 40 (first embodiment), and the locking-base coupling portion 12b of the torsion bar 12 is press fit to the cylindrical boss portion 18 of the locking base 15 (second embodiment) in the thrust direction (FIG. 6B or 7B), a variation of a press fitting force (resistive force) is reduced with respect to a change of press fitting margin.

In the coupling portion 43 of the torsion bar 2 with the retainer 40 (first embodiment) or the coupling portion 17 of the torsion bar 12 with the locking base 15 (second embodiment), the torsion bar 2 (12) is displaceable in the thrust directions but is radially unrotational with respect to the retainer 40 (locking base 15).

Alternatively, in the coupling portion of the torsion bar with the retainer and the coupling portion of the torsion bar with the locking base, the torsion bars are displaceable in the thrust directions but are radially unrotational with respect to the retainer and locking base.

As seen from the foregoing description, a distance between the coupling portions located at both ends of the torsion bar is increased. A length of a deformable portion of the torsion bar, which is located between the coupling portions, is substantially increased without increasing an overall length of the torsion bar.

The seat belt retractor increases the number of twists of the torsion bar without increasing the width of the locking base (when viewed in the axial direction), and hence stably secures a satisfactory number of twists of the torsion bar.

Further, the seat belt retractor 100 can provide a satisfactory number of twists of the torsion bar 2 even if the torsion bar 2 is increased in its diameter to obtain a high torsional torque, and a long energy absorbing length is required.

Additionally, even if the axial length of the torsion bar changes through a torsional deformation of the torsion bar during its energy absorbing operation, one of the coupling portions of the torsion bar moves in the axial direction of the torsion bar, whereby a change of the axial length of the torsion bar is absorbed.

The result is to prevent the end face of the locking base closer to the take-up shaft from forcibly and slidably contacting with the end face of the take-up shaft closer to the locking base, and the locking base from moving to outside the retractor base.

Therefore, the present invention provides a seat belt retractor which can eliminate the disadvantages created by a change of the axial-direction length of the torsion bar, which results from a torsional deformation of the torsion bar.

What is claimed is:

1. A seat belt retractor comprising:

a base having a pair of side plates;

a bobbin coupled with a webbing;

a torsion bar rotatably supported on said side plates of said base, one end of said torsion bar being coupled with said bobbin; and a locking mechanism coupled with another end of said torsion bar, said locking mechanism connecting said another end of said torsion bar with said base in a first state and not connecting in a second state, wherein said torsion bar includes a torsionally deformable portion on a side at which said bobbin is coupled between two coupling portions thereof, and at least a part of said torsionally deformable portion is located outside beyond one of said side plates of said base.

2. A seat belt retractor comprising:

a base having a pair of side plates;

a bobbin coupled with a webbing;

a torsion bar rotatably supported on said side plates of said base, one end of said torsion bar being coupled with said bobbin;

a locking mechanism coupled with another end of said torsion bar, said locking mechanism connecting said another end of said torsion bar with said base in a first state and not connecting in a second state, wherein said torsion bar includes a torsionally deformable portion between two coupling portions thereof and at least a part of said torsionally deformable portion is located outside beyond one of said side plates of said base; and a retainer fit to an end face of said bobbin closer to said one end of said torsion bar and passing through said one side plate of said base so as to extend outside beyond said one side plate of said base, said one end of said torsion bar being coupled with said retainer outside said one side plate.

3. A seat belt retractor comprising:

a base having a pair of side plates;

a bobbin coupled with a webbing;

a torsion bar rotatably supported on said side plates of said base, one end of said torsion bar being coupled with said bobbin; and a locking mechanism coupled with another end of said torsion bar, said locking mechanism connecting said another end of said torsion bar with said base in a first state and not connecting in a second state, wherein at least one of two coupling portions of said torsion bar at which the torsion bar is coupled with said bobbin and said locking mechanism is axially displaceable with respect to said bobbin and said locking mechanism in such a manner that said bobbin and said locking mechanism are held in a predetermined position when said torsion bar is torsionally deformed and a length thereof is changed.

4. A seat belt retractor comprising:

a base having a pair of side plates;

a bobbin coupled with a webbing;

a torsion bar rotatably supported on said side plates of said base, one end of said torsion bar being coupled with said bobbin; and a locking mechanism coupled with another end of said torsion bar, said locking mechanism connecting said another end of said torsion bar with said base in a first state and not connecting in a second state, wherein at least one of two coupling portions of said torsion bar at which the torsion bar is coupled with said bobbin and said locking mechanism is axially displaceable, wherein said torsion bar includes a first coupling portion at which said one end of said torsion bar is coupled with said bobbin and a second coupling portion at which said another end of said torsion bar is coupled with said locking mechanism, wherein a space to allow said two coupling portions to be separated from each other when said torsion bar is elongated by torsional deformation, is provided in at least one of outside spaces which are located outside in an axial direction of said two coupling portions, said space is extended in the axial direction of said torsion bar while securing an external size in a cross section which is equal to or larger than an external size in a cross section of at least one of said two coupling portions.

5. A seat belt retractor comprising:

a base having a pair of side plates;

a bobbin coupled with a webbing;

a torsion bar rotatably supported on said side plates of said base, one end of said torsion bar being coupled with said bobbin; and a locking mechanism coupled with another end of said torsion bar, said locking mechanism connecting said another end of said torsion bar with said base in a first state and not connecting in a second state, wherein two coupling portions of said torsion bar at which the torsion bar is coupled with said bobbin and said locking mechanism comprise light press fitting to prevent said torsion bar and said bobbin or said torsion bar and said locking mechanism from rotating with respect to each other, wherein said light press fitting comprises said two coupling portions of said torsion bar having a polygonal cross section respectively, and engage portions respectively formed in said bobbin and said locking mechanism, said engage portions respectively having curved portions to overlap vertices of the polygonal cross section of said coupling portion.

6. A seat belt retractor comprising:

a base having a pair of side plates;

a bobbin coupled with a webbing;

a torsion bar rotatably supported on said side plates of said base, one end of said torsion bar being coupled with said bobbin; and a locking mechanism coupled with another end of said torsion bar, said locking mechanism connecting said another end of said torsion bar with said base in a first state and not connecting in a second state, wherein two coupling portions of said torsion bar at which the torsion bar is coupled with said bobbin and said locking mechanism comprise light press fitting to prevent said torsion bar and said bobbin or said torsion bar and said locking mechanism from rotating with respect to each other, wherein said light press fitting comprises said two coupling portions of said torsion bar having a polygonal cross section respectively, and engage portions respectively formed in said bobbin and said locking mechanism, said engage portions being respectively configured so as to have a polygonal cross section which is slightly larger than and similar to the polygonal cross section of said coupling portion, and having ridges formed at locations off vertices of the polygonal cross section to overlap said coupling portion of said torsion bar.

\* \* \* \* \*